United States Patent
Martel et al.

(10) Patent No.: US 10,327,013 B2
(45) Date of Patent: *Jun. 18, 2019

(54) SYSTEM AND METHOD FOR ASYNCHRONOUS UPLOADING OF LIVE DIGITAL MULTIMEDIA WITH GUARANTEED DELIVERY

(71) Applicant: LIVING AS ONE, LLC, Richardson, TX (US)

(72) Inventors: Paul Martel, Richardson, TX (US); Bradley Reitmeyer, Allen, TX (US)

(73) Assignee: LIVING AS ONE, LLC, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,312

(22) Filed: Apr. 3, 2018

(65) Prior Publication Data
US 2018/0227602 A1   Aug. 9, 2018

Related U.S. Application Data

(63) Continuation of application No. 15/462,816, filed on Mar. 18, 2017, now Pat. No. 9,936,228, which is a
(Continued)

(51) Int. Cl.
| | |
|---|---|
| H04N 7/173 | (2011.01) |
| H04N 21/2187 | (2011.01) |
| H04N 21/2365 | (2011.01) |
| H04N 21/6334 | (2011.01) |
| H04N 21/432 | (2011.01) |
| H04N 21/6377 | (2011.01) |

(Continued)

(52) U.S. Cl.
CPC ..... *H04N 21/2187* (2013.01); *H04N 21/2365* (2013.01); *H04N 21/2743* (2013.01); *H04N 21/432* (2013.01); *H04N 21/63345* (2013.01); *H04N 21/63775* (2013.01); *H04N 21/8456* (2013.01)

(58) Field of Classification Search
CPC ........... H04N 21/2187; H04N 21/2365; H04N 21/6334; H04N 21/432; H04N 21/6377; H04N 21/63345; H04N 21/63775
See application file for complete search history.

(56) References Cited

U.S. PATENT DOCUMENTS

| | | |
|---|---|---|
| 6,389,473 B1 | 5/2002 | Carmel et al. |
| 7,047,309 B2 | 5/2006 | Baumann et al. |

(Continued)

OTHER PUBLICATIONS

HTTP Live Streaming draft-pantos-http-live-streaming-19, R. Pantos. Apr. 4, 2016.
(Continued)

*Primary Examiner* — John R Schnurr

(57) ABSTRACT

A system for asynchronous uploading of digital multimedia with guaranteed delivery is provided. The system comprises at least one processor and a memory coupled to the at least one processor, the memory containing computer executable instructions that, when executed by the at least one processor, cause the system to attempt by at least one upload worker thread to transmit a first container to a remote server, execute by the at least one upload worker thread a data integrity test on the first container upon a successful upload of the first container, and repeat, if the data integrity test fails, the attempt and execute steps.

20 Claims, 13 Drawing Sheets

Related U.S. Application Data continuation of application No. 15/252,368, filed on Aug. 31, 2016, now Pat. No. 9,602,846.

(51) Int. Cl.
*H04N 21/2743* (2011.01)
*H04N 21/845* (2011.01)

(56) References Cited

U.S. PATENT DOCUMENTS

| | | |
|---|---|---|
| 8,285,867 B1 | 10/2012 | Edelman et al. |
| 2003/0079222 A1 | 4/2003 | Boykin et al. |
| 2004/0255335 A1 | 12/2004 | Fickle et al. |
| 2007/0050834 A1 | 3/2007 | Royo et al. |
| 2009/0037967 A1 | 2/2009 | Barkan et al. |
| 2011/0252118 A1 | 10/2011 | Pantos et al. |
| 2012/0110609 A1 | 5/2012 | Guo et al. |
| 2012/0311094 A1 | 12/2012 | Biderman et al. |
| 2014/0165118 A1 | 6/2014 | Garcia Mendoza et al. |
| 2014/0165120 A1 | 6/2014 | Losev et al. |
| 2014/0189761 A1 | 7/2014 | Sood et al. |
| 2015/0208103 A1 | 7/2015 | Guntur et al. |
| 2015/0249845 A1 | 9/2015 | Tirosh et al. |
| 2015/0350711 A1 | 12/2015 | Guzik |
| 2016/0050453 A1 | 2/2016 | Cottrell et al. |
| 2016/0080807 A1 | 3/2016 | Trimper et al. |
| 2016/0119679 A1 | 4/2016 | Randall et al. |
| 2016/0142752 A1 | 5/2016 | Ohno et al. |

OTHER PUBLICATIONS

Delivering Live YouTube Content Via DASH, Retrieved from https://developers.google.com/youtube/v3/live/guides/encoding-with-dash, Last updated May 26, 2016.

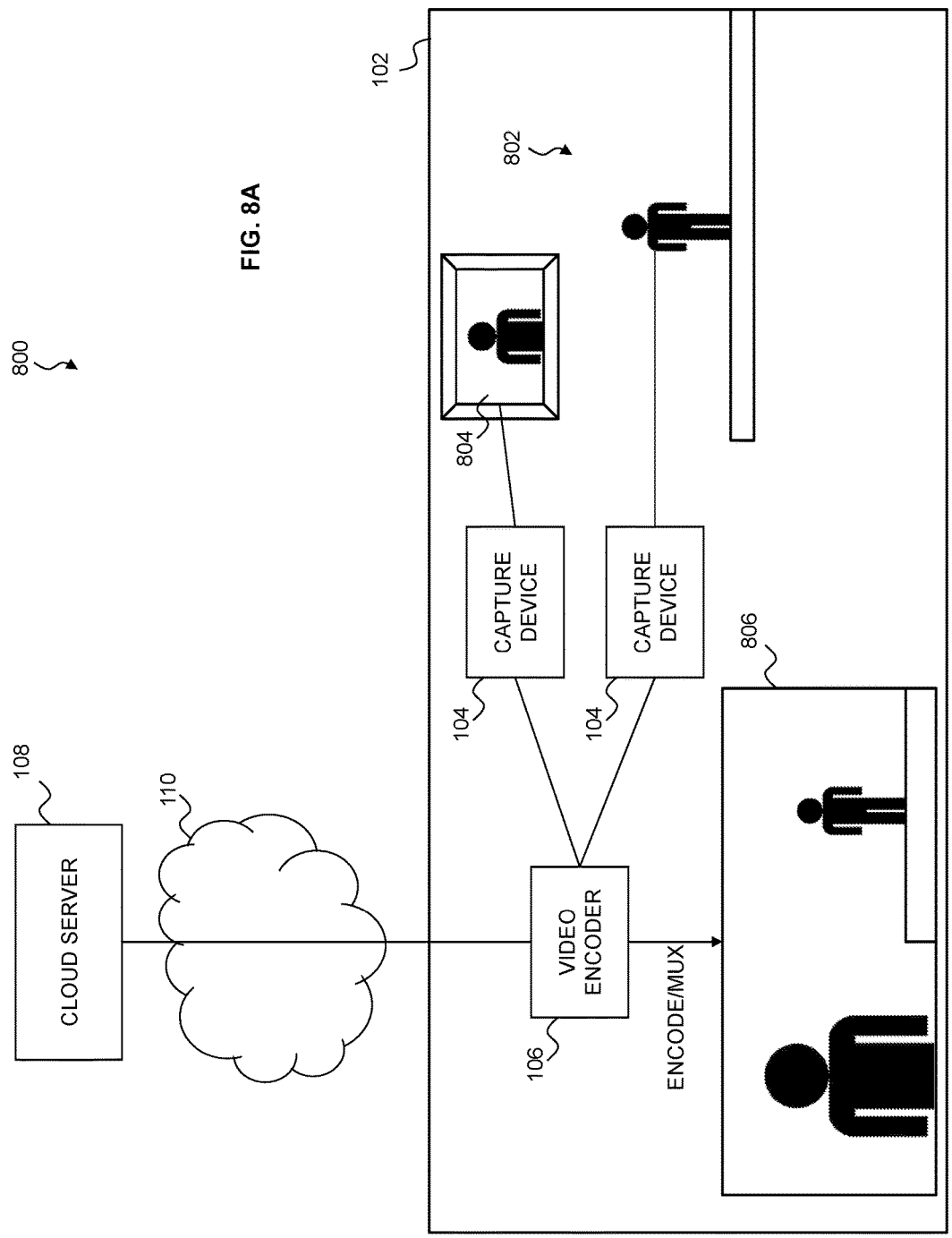

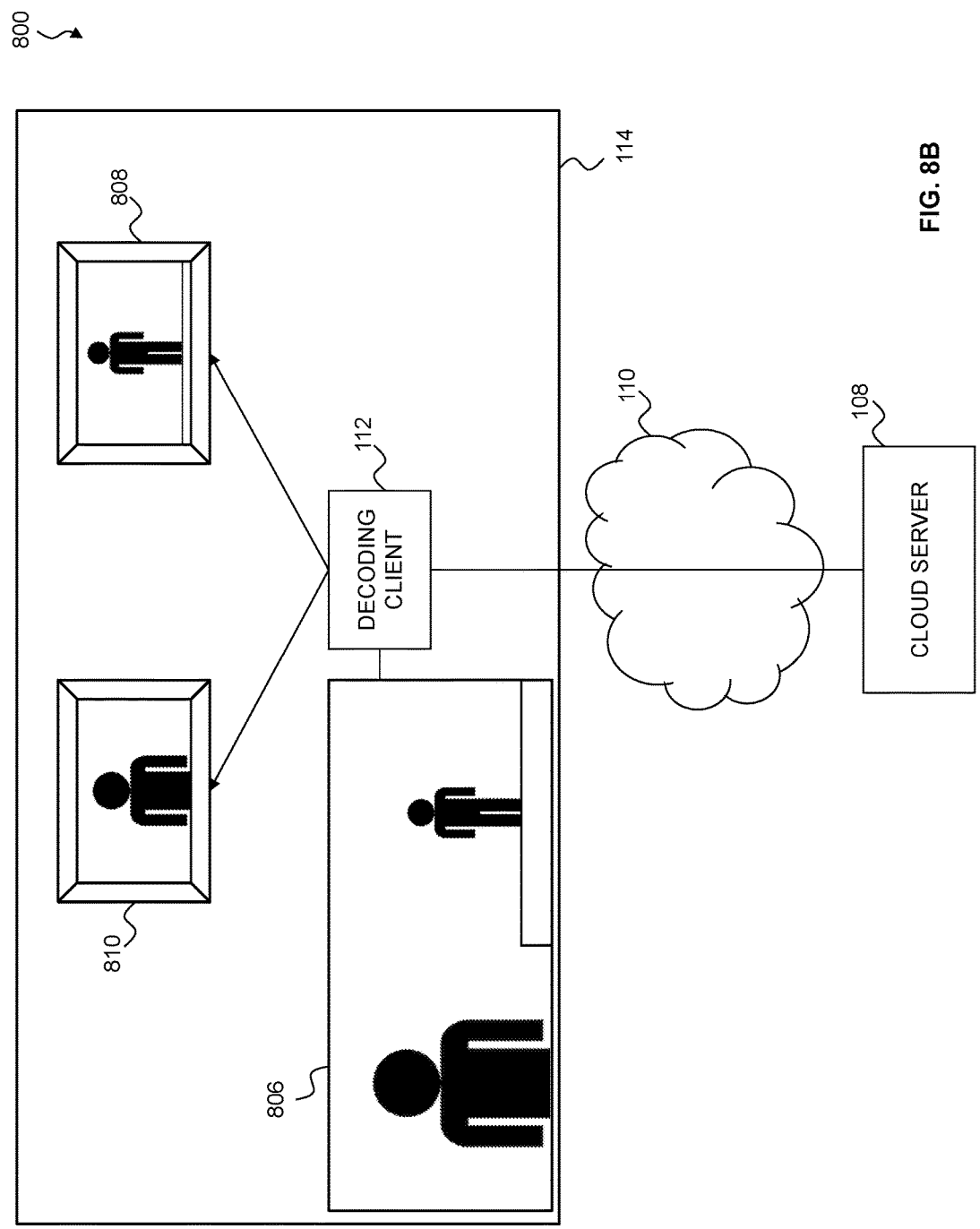

SYSTEM AND METHOD FOR ASYNCHRONOUS UPLOADING OF LIVE DIGITAL MULTIMEDIA WITH GUARANTEED DELIVERY

CROSS-REFERENCE TO RELATED APPLICATIONS

This application is a Continuation of U.S. patent application Ser. No. 15/462,816, filed on Mar. 18, 2017, which issued on Apr. 3, 2018, as U.S. Pat. No. 9,936,228, and entitled SYSTEM AND METHOD FOR ASYNCHRONOUS UPLOADING OF LIVE DIGITAL MULTIMEDIA WITH GUARANTEED DELIVERY. U.S. patent application Ser. No. 15/462,816 is a continuation of U.S. patent application Ser. No. 15/252,368, filed on Aug. 31, 2016, which issued on Mar. 21, 2017, as U.S. Pat. No. 9,602,846, and entitled SYSTEM AND METHOD FOR ASYNCHRONOUS UPLOADING OF LIVE DIGITAL MULTIMEDIA WITH GUARANTEED DELIVERY. U.S. application Ser. Nos. 15/462,816 and 15/252,368, and U.S. Pat. Nos. 9,602,846 and 9,936,228, are incorporated by reference herein in their entirety.

TECHNICAL FIELD

The following disclosure is related to digital content streaming and, more specifically, to asynchronous queueing and uploading of content.

BACKGROUND

Streaming live digital multimedia may result in a lower quality playback experience for end users because any issue with the upload process (from encoder to media server) may result in missing, incomplete, or degraded content. This defective content is then transmitted to end users in the same defective state, even when using a distribution network. This issue may be accepted by some end users because those end users might prefer to view the content as close to realtime as possible. However, some end users prefer for the content to be high quality and gapless upon viewing, and will therefore accept a higher latency (time delay) when viewing the live content. Accordingly, what is needed are a system and method that provides an upload process which ensures that continuous high quality digital multimedia content is available in its entirety despite network disruptions.

SUMMARY

In one aspect thereof, a system for asynchronous uploading of digital multimedia with guaranteed delivery is provided. The system comprises at least one processor and a memory coupled to the at least one processor, the memory containing computer executable instructions that, when executed by the at least one processor, cause the system to attempt by at least one upload worker thread to transmit a first container to a remote server, execute by the at least one upload worker thread a data integrity test on the first container upon a successful upload of the first container, and repeat, if the data integrity test fails, the attempt and execute steps.

In another embodiment, the computer executable instructions, when executed by the at least one processor, further cause the system to determine by the at least one upload worker thread if an instability with a connection to the remote server exists, and, if so, repeat the attempt and determine steps.

In another embodiment, the computer executable instructions, when executed by the at least one processor, further cause the system to set a reattempt threshold, wherein the reattempt threshold is a number of upload reattempts allowed in the event of an instability with the connection to the remote server or a failure of the data integrity test, and determine upon reaching one of the repeat steps, whether the reattempt threshold has been reached, and, if so, place the first container back in an upload queue.

In another embodiment, placing the first container instead places the first container into a separate reattempt queue.

In another embodiment, the computer executable instructions, when executed by the at least one processor, further cause the system to check, before the upload worker thread takes the first container from the upload queue, whether the separate reattempt queue currently contains a reattempt container, and, if so remove the reattempt container from the separate reattempt queue, start by the at least one upload worker thread a communications protocol client, wherein the communication protocol client establishes a connection to the remote server, attempt by the at least one upload worker thread to transmit the reattempt container to the remote server, determine by the at least one upload worker thread if an instability with the connection to the remote server exists, and, if so, repeat the attempt and determine steps, execute by the at least one upload worker thread a data integrity test on the reattempt container upon a successful upload of the reattempt container, repeat, if the data integrity test fails, the attempt, determine, and execute steps, and determine upon reaching one of the repeating steps, whether the reattempt threshold has been reached, and, if so, place the reattempt container back in the reattempt queue.

In another embodiment, the computer executable instructions, when executed by the at least one processor, further cause the system to create a manifest, store the manifest on a local storage device, add the manifest to an upload queue, create a container, wherein the container includes content therein, store the container on the local storage device, add the container to the upload queue, initiate at least one upload worker thread, wherein the at least one upload worker thread is a process that performs independently of the create, store, and add steps, and wherein the process performs independently of other upload worker threads, remove the first container from the upload queue, and start by the at least one upload worker thread a communications protocol client, wherein the communication protocol client establishes a connection to the remote server.

In another embodiment, the computer executable instructions, when executed by the at least one processor, further cause the system to encrypt the container, resulting in an encrypted container.

In another embodiment, the computer executable instructions, when executed by the at least one processor, further cause the system to create a decryption key associated with the encrypted container, update the manifest to include information related to the decryption key, and upload by the upload worker thread the decryption key to the remote server.

In another embodiment, the system further comprises a decoding client, wherein the decoding client includes executable instructions for downloading a plurality of data from the remote server, wherein the plurality of data includes the manifest, the first container, and any other data uploaded to the remote server by the at least one upload worker thread, and storing the plurality of data on a local storage drive.

In another embodiment, the decoding client further includes instructions for determining if a buffer limit has been reached, wherein the buffer limit is a set amount of data allowed to be downloaded, and when the buffer limit is reached, temporarily halting downloading of the plurality of data.

In another aspect thereof, a method for asynchronous uploading of digital multimedia with guaranteed delivery is provided. The method comprises attempting by at least one upload worker thread to transmit a first container to a remote server, executing by the at least one upload worker thread a data integrity test on the first container upon a successful upload of the first container, and repeating, if the data integrity test fails, the attempting and executing steps.

In another embodiment, the method further comprises determining by the at least one upload worker thread if an instability with a connection to the remote server exists, and, if so, repeating the attempting and determining steps.

In another embodiment, the method further comprises setting a reattempt threshold, wherein the reattempt threshold is a number of upload reattempts allowed in the event of an instability with the connection to the remote server or a failure of the data integrity test, and determining upon reaching one of the repeating steps, whether the reattempt threshold has been reached, and, if so, placing the first container back in an upload queue.

In another embodiment, the placing step instead places the first container into a separate reattempt queue.

In another embodiment, the method further comprises checking, before the upload worker thread takes the first container from the upload queue, whether the separate reattempt queue currently contains a reattempt container, and, if so, removing the reattempt container from the separate reattempt queue, starting by the at least one upload worker thread a communications protocol client, wherein the communication protocol client establishes a connection to the remote server, attempting by the at least one upload worker thread to transmit the reattempt container to the remote server, determining by the at least one upload worker thread if an instability with the connection to the remote server exists, and, if so, repeating the attempting and determining steps, executing by the at least one upload worker thread a data integrity test on the reattempt container upon a successful upload of the reattempt container, repeating, if the data integrity test fails, the attempting, determining, and executing steps, and determining upon reaching one of the repeating steps, whether the reattempt threshold has been reached, and, if so, placing the reattempt container back in the reattempt queue.

In another embodiment, the method further comprises creating a manifest, storing the manifest on a local storage device, adding the manifest to an upload queue, creating a container, wherein the container includes content therein, storing the container on the local storage device, adding the container to the upload queue, initiating at least one upload worker thread, wherein the at least one upload worker thread is a process that performs independently of the creating, storing, and adding steps, and wherein the process performs independently of other upload worker threads, removing the first container from the upload queue, and starting by the at least one upload worker thread a communications protocol client, wherein the communication protocol client establishes a connection to the remote server.

In another embodiment, the method further comprises encrypting the container, resulting in an encrypted container.

In another embodiment, the method further comprises creating a decryption key associated with the encrypted container, updating the manifest to include information related to the decryption key, and uploading by the upload worker thread the decryption key to the remote server.

In another embodiment, the method further comprises downloading by a decoding client a plurality of data from the remote server, wherein the plurality of data includes the manifest, the first container, and any other data uploaded to the remote server by the at least one upload worker thread, and storing the plurality of data on a local storage drive.

In another embodiment, the method further comprises determining by the decoding client if a buffer limit has been reached, wherein the buffer limit is a set amount of data allowed to be downloaded, and when the buffer limit is reached, temporarily halting downloading of the plurality of data.

BRIEF DESCRIPTION OF THE DRAWINGS

For a more complete understanding, reference is now made to the following description taken in conjunction with the accompanying Drawings in which:

FIG. 8A illustrates a diagrammatic view of one embodiment of a combined dual stream video encoding and output system;

FIG. 8B illustrates another diagrammatic view of the system of FIG. 8A;

DETAILED DESCRIPTION

Figure 1:
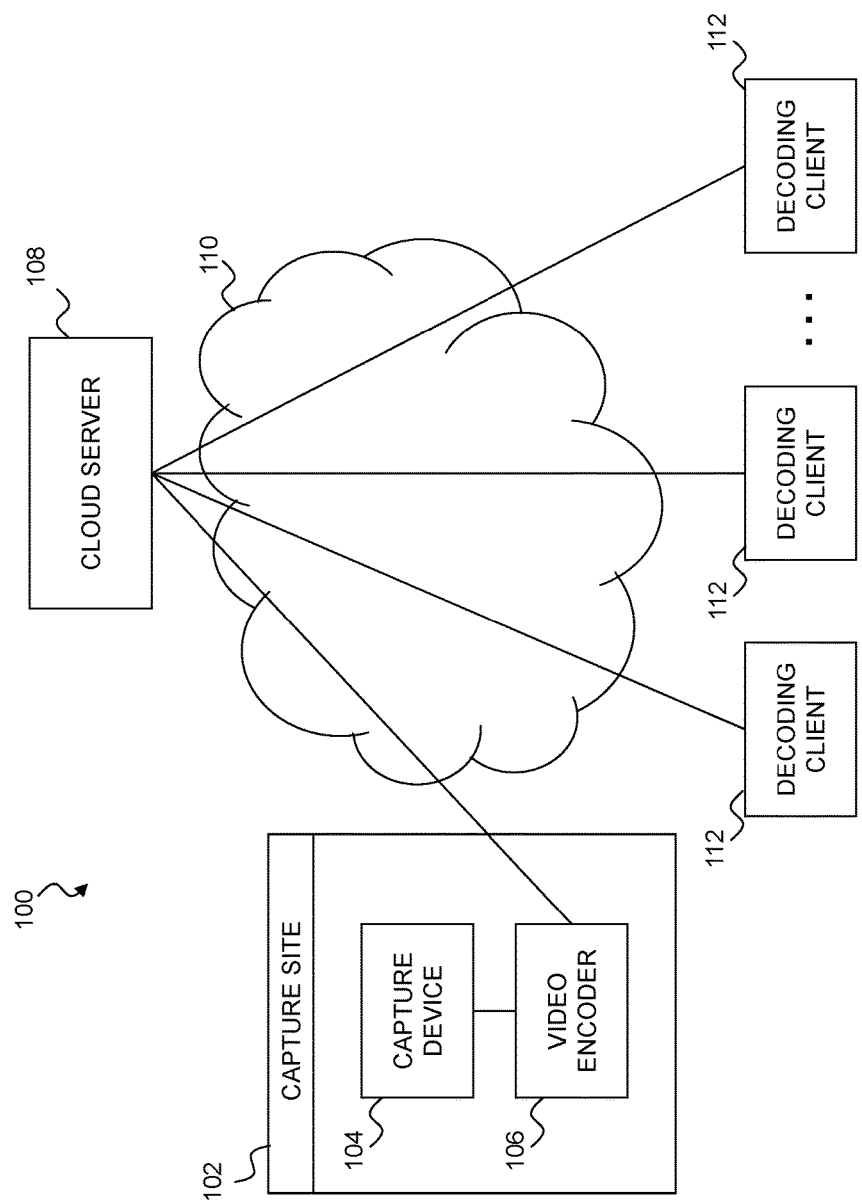
FIG. 1 illustrates one embodiment of a digital content streaming system.

Referring now to the drawings, wherein like reference numbers are used herein to designate like elements throughout, the various views and embodiments of a system and method for asynchronous uploading of live digital multimedia with guaranteed delivery are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated one embodiment of a digital content streaming system 100. The system 100 includes a capture site 102. The capture site 102 is a location at which digital content is to be captured, or recorded, and stored. The capture site 102 may include a capture device 104 connected to a video encoder 106. In some embodiments, the capture device 102 may be a physical device for capturing video and audio that passes the captured video and audio to the video encoder 106. For instance, the capture device 104 could be a video camera connected as a peripheral device to the video encoder 106, a webcam contained within the video encoder 106, a device on a network to capture video and audio and to transmit the video and audio to the video encoder 106 over the network, or any other device capable of capturing video and audio. In other embodiments, the capture device 104 may not be a physical device, but rather a method for acquiring video by the video encoder 106 such as software and network processes and functions, including, but not limited to, an ability of the video encoder 106 to capture video of its associated display, such as recording its desktop, retrieving a video from a location on a network, and using technologies such as Network Device Interface (NDI). In embodiments using technologies similar to NDI, multimedia content may be captured by a device on a network which the video encoder 106 is also connected. The video encoder 106 could receive this multimedia content over the network to encode or re-encode the content. Therefore, the capture device 104, in its various embodiments, is not limited to physical devices that allow for the capture of video and audio content, but also may include any other means for accessing content by the video encoder 106, such as video content being already stored on the network and retrieved by the video encoder 106.

The video encoder 106 may be a custom built machine that allows for video to be received via a capture device, processed, and stored on a local drive connected to the machine. The video encoder 106 may run an operating system capable of executing various programs. The video encoder 106 also may, in some embodiments, operate as a web server similar in function to the cloud server 108. In this way, the video encoder 106 may provide digital content to client applications running on equipment that is either on the local network of the video encoder 106, or on outside networks. The video encoder may also establish a connection with a cloud server 108 over a network 110 for enhanced distribution capabilities.

The cloud server 108 serves to store digital content uploaded to the cloud server 108 by the video encoder 106. The cloud server 108 may then stream the digital content to a plurality of decoding clients 112 connected to the cloud server 108 over the network 110. The plurality of decoding clients 112 may be, or run, on any device capable of executing the decoding client, including PCs, laptops, mobile devices, custom decoding machines, or other devices. Additionally, the decoding client 112 may be a program stored and executed by a device or may be implemented in other ways, such as within a webpage accessed by a web browser. The cloud server 108 may be a single server accessed over the Internet, or may be a distribution system containing multiple servers designed to meet the load demand of a large number of end users. This distribution system may be a content delivery network (CDN) provided by a third-party with the resources and capacity to meet the demand, such as those provided by Google, Amazon, and others.

The plurality of decoding clients 112 may run on devices having appropriate output ports for allowing a display to be connected thereto for viewing the digital content, such as VGA ports, composite video (RCA) ports, HD-SDI, HDMI ports, or any other ports capable of allowing a display to be connected to the decoding clients 112. Alternatively, the plurality of decoding clients 112 may also allow for viewing of the digital content on a display directly connected to the device on which the decode client 112 is running, such as laptops, mobile devices, or any other device having a display. The decoding clients 112 may be executed on a device running an operating system capable of executing various programs. The decoding clients 112 may be executed on custom built decoder boxes supplied to various partners of the capture site, on a PC running an operating system and capable of running the decoding client, or any other device that allows for the decoding client to be executed thereon.

The embodiments described herein disclose a system in which all segmenting of files is done at the video encoder 106. The video encoder 106 further stores all segmented files and the manifest files. Therefore, in some embodiments, the cloud server 108 is used merely for providing the bandwidth required to meet the demand of end users. The video encoder 106, or a server connected locally to the video encoder 106, can function in place of the cloud server 108 as a web server if needed. The cloud server 108 does not perform any of the operations of segmenting files, but rather only stores segment files and manifest files for download by end users using the decoding client 112.

Figure 2:
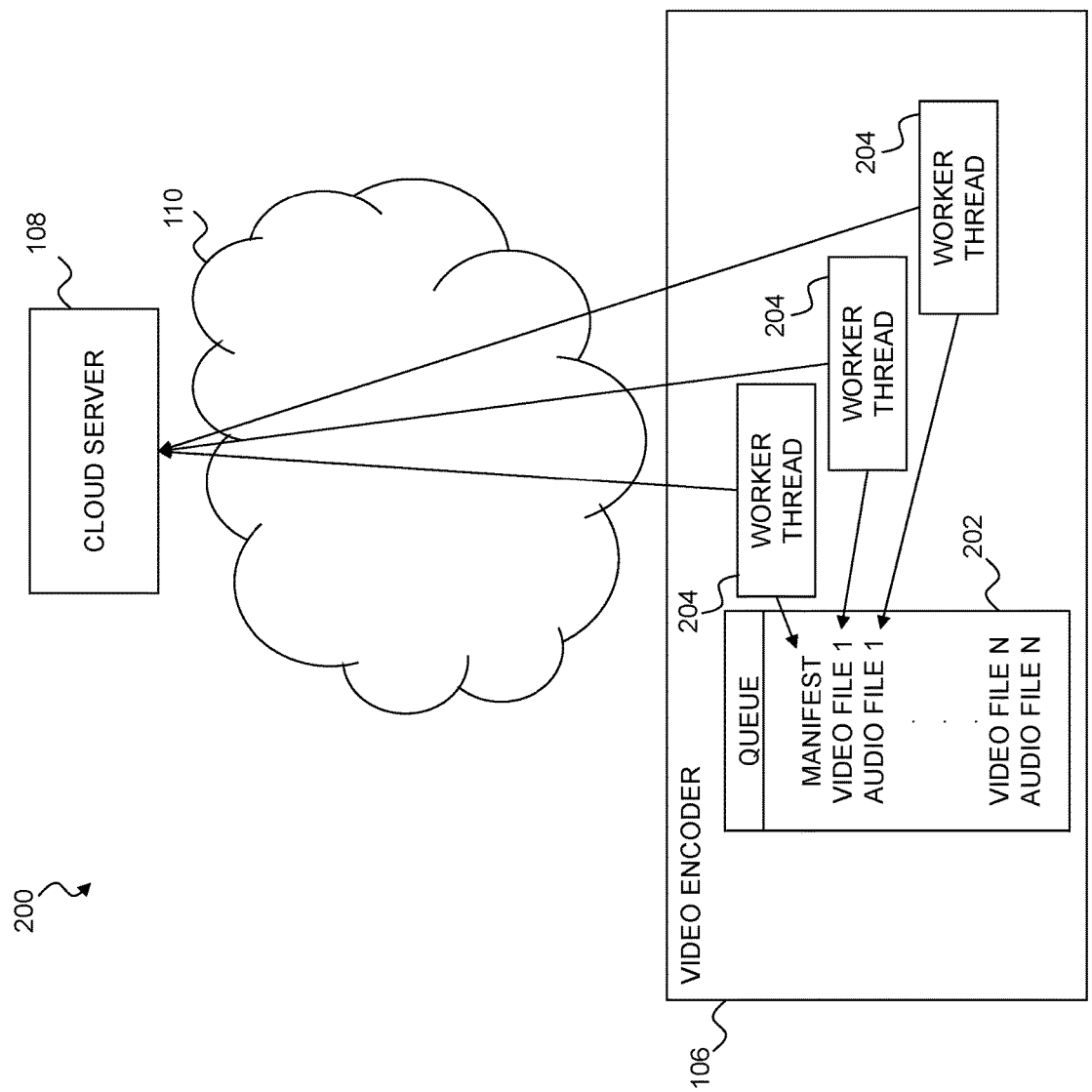
FIG. 2 illustrates one embodiment of an asynchronous queuing and upload system.

Referring now to FIG. 2, there is illustrated one embodiment of an asynchronous queuing and upload system 200. The video encoder 106 creates a queue of segment files 202. Segment files are typically files that are short segments of the digital content created from the source content to allow for faster uploading and downloading. The segment files may be segmented based on particular lengths, such as four seconds, with each segment being of the same length. It will be appreciated by one skilled in the art that other lengths may be used. Additionally, in some cases the last segment file for a particular item of digital content may be of a different length than the other segment files. For instance, if the segment files are designated as being four seconds each, and the source content is a total of 58 seconds in length, the segment files may have 15 segment files consisting of 14 four-second segments and one two-second segment as the last segment. The segment files in the queue may consist of audio files, video files, or any other type of digital content. Additionally, the queue may also include a manifest file. The manifest file contains information on all the segment files that includes information that allows for those segment files to be located on and downloaded from the cloud server 108 or any other location they may be stored.

The system 200 further includes at least one upload worker thread 204. An upload worker thread 204 is a separate process or function that runs independently from any other threads and from other operations run by the video encoder 106, such as receiving audio and video content, and encoding, segmenting, and adding to the queue 202 said content. One purpose of the upload worker threads 204 is to take files from the queue 202, with the first file in the queue 202 (first-in-first-out) being taken by the first worker thread 204 that is started. The upload worker thread 204 then attempts to upload the file to the cloud server 108. Any number of worker threads 204 may be initiated, each taking a file from the queue 202, to allow for multiple files to be within the upload process at the same time. However, as each upload worker thread 204 operates independently from other operations of the video encoder 106, the files are thus uploaded asynchronously from those other operations.

For example, the video encoder 106 may continue to receive, encode, segment, and add video to the queue 202 while upload worker threads continue to take files from the queue 202 and upload them to the cloud server 108. The upload worker threads will continue to work if needed if the other processes have stopped, and the other processes of recording, segmenting, storing, and queueing will continue even if the upload worker threads have stopped. The upload worker threads 204 also work asynchronously from each other, with each upload worker thread 204 finishing its task depending on how quickly that particular upload worker thread 204 accomplishes the task. Therefore, the upload worker threads 204 may finish uploading the files at different times. Once an upload worker thread 204 finishes its task, it is terminated and, if more files are still in the queue, another upload worker thread 204 is started to take and upload the next file in the queue.

It will be appreciated by one skilled in the art that the number of upload worker threads 204 may vary depending on the desired speed of uploading all files in the queue 202, and the amount of accepted overhead and use of system resources. For example, in some systems, only three upload worker threads 204 may be allowed to run, while other systems may allow for ten, for example, or any other number.

Figure 3:
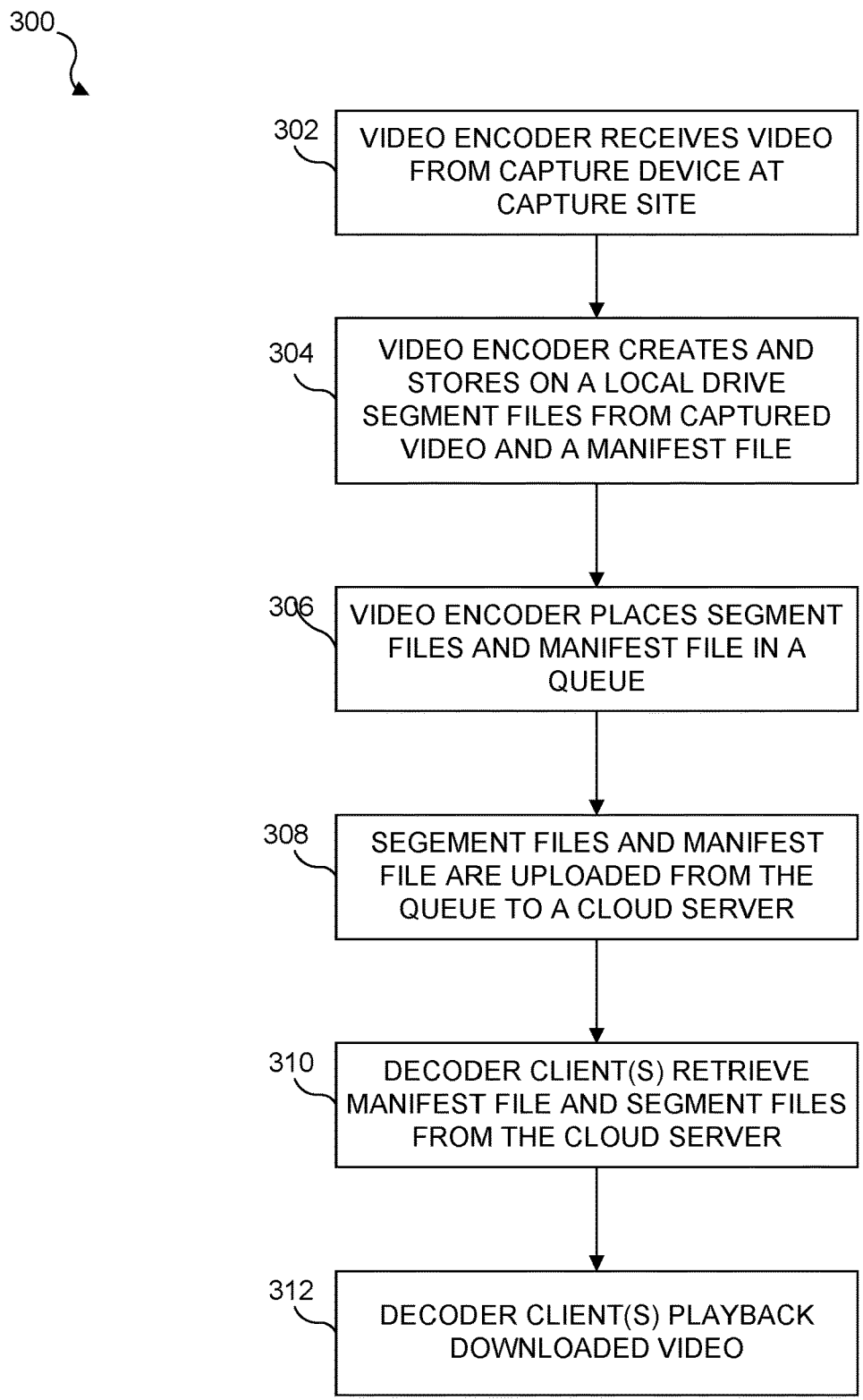
FIG. 3 illustrates a flowchart of one embodiment of a video streaming process.

Referring now to FIG. 3, there is illustrated a flowchart of one embodiment of a video streaming process 300. At step 302, the video encoder 106 receives video from the capture device 104. At step 304, the video encoder 106 creates and stores on a local drive connected to the video encoder 106 segment files created from the captured video, as well as a manifest file. The segment files may be both video and audio files, with each segment being of a particular length, such as four seconds. Since the segment files are stored on a local drive, in some embodiments the video encoder 106 may act as a web server to allow devices on the local network to access the content, or, in some embodiments, to allow for devices outside of the local network to access the content over the network 110.

At step 306, the video encoder 106 places the segment files and the manifest file in a queue. At step 308, the segment files and manifest file are uploaded to a cloud server in the manner described herein. At step 310, the plurality of decoding clients 112 retrieve the manifest file and the segment files from the cloud server in the manner described herein. At step 312, the plurality of decoding clients 112 playback the downloaded content. It will be appreciated that the digital content provided by this process and the other processes disclosed herein may be other forms of digital content besides video, such as audio content, or other forms of digital content that can be provided in this manner.

It will be understood that segment files may be encrypted and later uploaded as encrypted files to the cloud server 108. The segment files may then be decrypted once downloaded in order to play the files. Decryption keys may be created and uploaded, listed in the manifest file, and downloaded along with the segment files.

Figure 4:
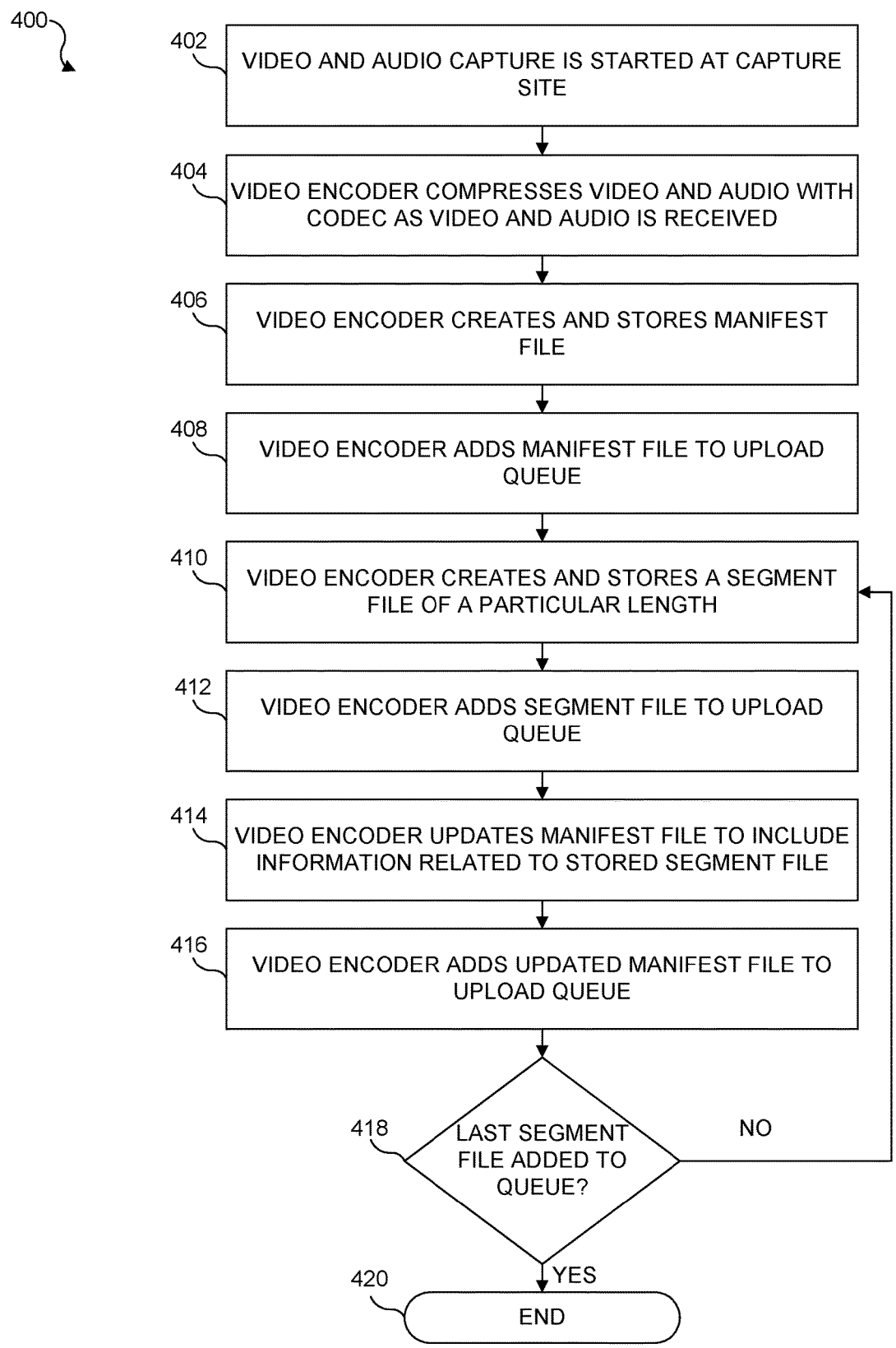
FIG. 4 illustrates a flowchart of one embodiment of a file segmenting and queueing process.

Referring now to FIG. 4, there is illustrated a flowchart of one embodiment of a file segmenting and queueing process 400. At step 402, video and audio capture is started at the capture site 102. Video and audio capture may include recording an event with a video camera, retrieving video from a location on a network, receiving video signals using NDI technologies, or any other means for acquiring video and audio by the video encoder 106. At step 404, the video encoder 106 compresses the video and audio using a defined codec as the video and audio is received. For example, video may be compressed using H.264, H.265/HEVC, VP8, VP9 or other video codecs. The audio may be encoded using AAC, MP3, Vorbis, Opus, or other audio codecs. Encoded audio and video may be assembled in container bitstreams using MP4, FLV, WebM, ASF, or other methods depending on the streaming protocol to be used. At step 406, the video encoder 106 creates and stores a manifest file. At step 408, the video encoder 106 adds the manifest file to an upload queue. At step 410, the video encoder 106 creates and stores a segment file of a particular length, such as four seconds. At step 412, the video encoder 106 adds the segment file to an upload queue. At step 414, the video encoder updates the manifest file to include information related to the segment file created in step 410. At step 416, the video encoder 106 adds the updated manifest file to the upload queue.

At decision block 418, it is determined whether the segment file added to the queue at step 412 is the last segment file that needs to be created, i.e., the last segment file containing the last portion of the source digital content. This determination may be accomplished by determining whether more content is currently being received from the capture device 104. If the segment file added to the queue in step 412 is not the last segment file that needs to be created, the process 400 moves back to step 410 to create, store, and add to the queue a new segment file (steps 410 and 412) and to update and add to the queue the manifest file (steps 414 and 416). If at step 418 it is determined that the segment file added to the queue at step 412 is the last segment file that needs to be created, the process 400 ends at step 420.

While the upload queue is created to facilitate upload of all files, the files may also be permanently stored at the storage drive associated with the video encoder 106. This ensures that a complete copy is saved, at least for a certain period of time or as defined by storage capacity, such as only allowing 12 hours of content to reside on the storage drive at a time, to ensure that no files are lost before a complete, high quality, copy of the content is uploaded and data integrity verified. Additionally, as noted herein, the video encoder 106 may act as a web server to provide the stored files to local or remote end users.

It will be understood that creation of the manifest file, creation of the segment files, and eventual streaming of the content to end users is accomplished using particular streaming libraries and protocols. Such streaming libraries may include FFmpeg, Libav, MPlayer, AviSynth, or others. Such streaming protocols may include Flash, Microsoft Smooth Streaming, Dynamic Adaptive Streaming over HTTP (DASH), HTTP Live Streaming (HLS), or other streaming protocols.

Figure 5:
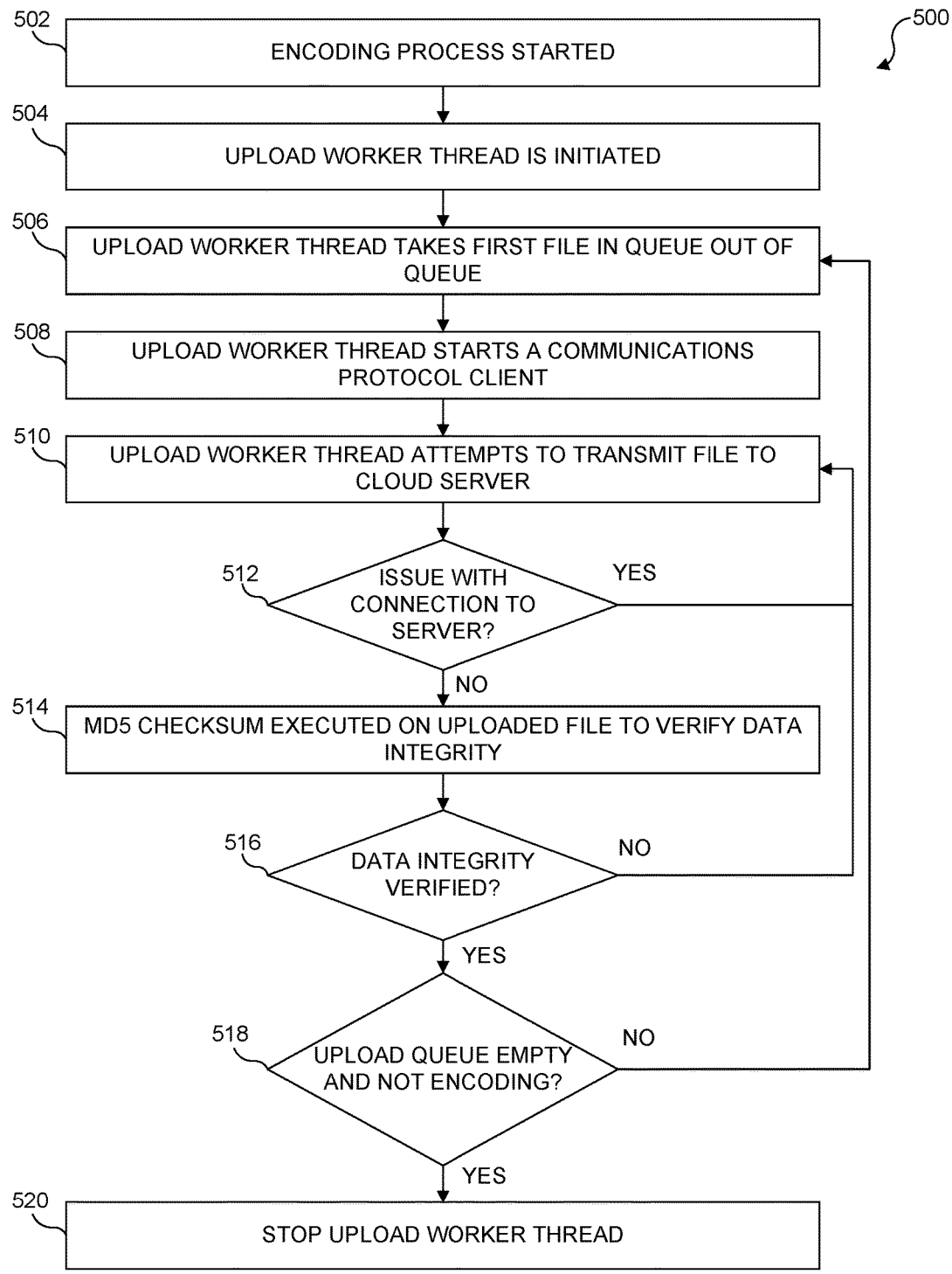
FIG. 5 illustrates a flowchart of one embodiment of an upload worker thread process.

Referring now to FIG. 5, there is illustrated a flowchart of one embodiment of an upload worker thread process 500. At step 502, the encoding process starts. At step 504, an upload worker thread is initiated. At step 506, the upload worker thread takes the first file in the queue out of the queue. This may be done with a command such as file f=queue.take( ), or any other command that accomplishes this task. It will be appreciated by one skilled in the art that step 506 may come before step 504. For instance, a program running on the video encoder 106 may take the first file out of the queue using a command such as file f=queue.take( ) (step 506), assign the file to a variable, and then pass the variable to a upload worker thread function, by a command such as upload(f), where upload( ) is an upload worker thread function call, thus creating the upload worker thread (step 504) with the file already taken out of the queue and known to the upload worker thread.

At step 508, the upload worker thread creates an instance of a communications protocol client. This may be a client using HTTP, IAP, FTP, SMTP, NNTP, or any other protocol for allowing transmission of information and files over the internet and using a transport layer protocol such as TCP. This may use a command such as HTTP Client client=new HTTP Client, for example, or another command for starting a new client. At step 510, the upload worker thread attempts to transmit the file to the cloud server 108. This attempt may use a command such as client.post(file), for example, or another command for sending the file. At decision block 512, it is determined whether there is any issue or instability with the connection to the cloud server 108. The issue may result from a drop in connection between the video encoder 106 and the cloud server 108, slow connection speeds, or any other issue that interferes with transmittal of the file to the cloud server. This may be an active check of the network status, or it may be passive. If it is a passive check, in some embodiments, the upload worker thread may simply stall until the connection is restored. In other embodiments, the upload worker thread may run a loop wherein multiple attempts are made to transmit the file, such as using a try/catch exception process wherein the upload status of the file is only verified if a network exception is not caught, and may also include a threshold wherein the loop will terminate upon a certain number of failed attempts. If it is determined that there is an issue with the connection to the server, the process moves back to step 510 to attempt to again transmit the file to the cloud server 108. If at step 512 there is no issue with the connection to the cloud server, the process 500 moves to step 514.

At step 514, an MD5 checksum is executed on the uploaded file to verify data integrity of the uploaded file. At decision block 516, it is determined whether the file passed the MD5 checksum. If the uploaded file did not pass the MD5 checksum, the process moves back to step 510 to again attempt to transmit the file to the cloud server 108, replacing the failed file. If the uploaded file passes the MD5 checksum, the process moves to decision block 518. At decision block 518, it is determined whether the upload queue is now empty and whether the encoder is no longer encoding content to be added to the queue. If the upload queue is empty and the encoder is finished encoding, the process 500 ends at step 520, where the upload worker thread is terminated. If the upload queue is not empty, the process 500 moves back to step 506 to take the next file in the queue. In the event that the upload queue is empty, but the encoder is still encoding content, the upload worker thread may sleep for a small amount of time before checking the queue again to determine if a file is now available to be processed.

It will be understood that there may be more than one upload worker thread working at the same time. For example, in some embodiments, three upload worker threads may be allowed to run concurrently. One may be finishing its task while the other two are still attempting to upload files they pulled from the queue. The one finishing its task is terminated at step 520, while the other two upload worker threads continue to work.

Figure 6:
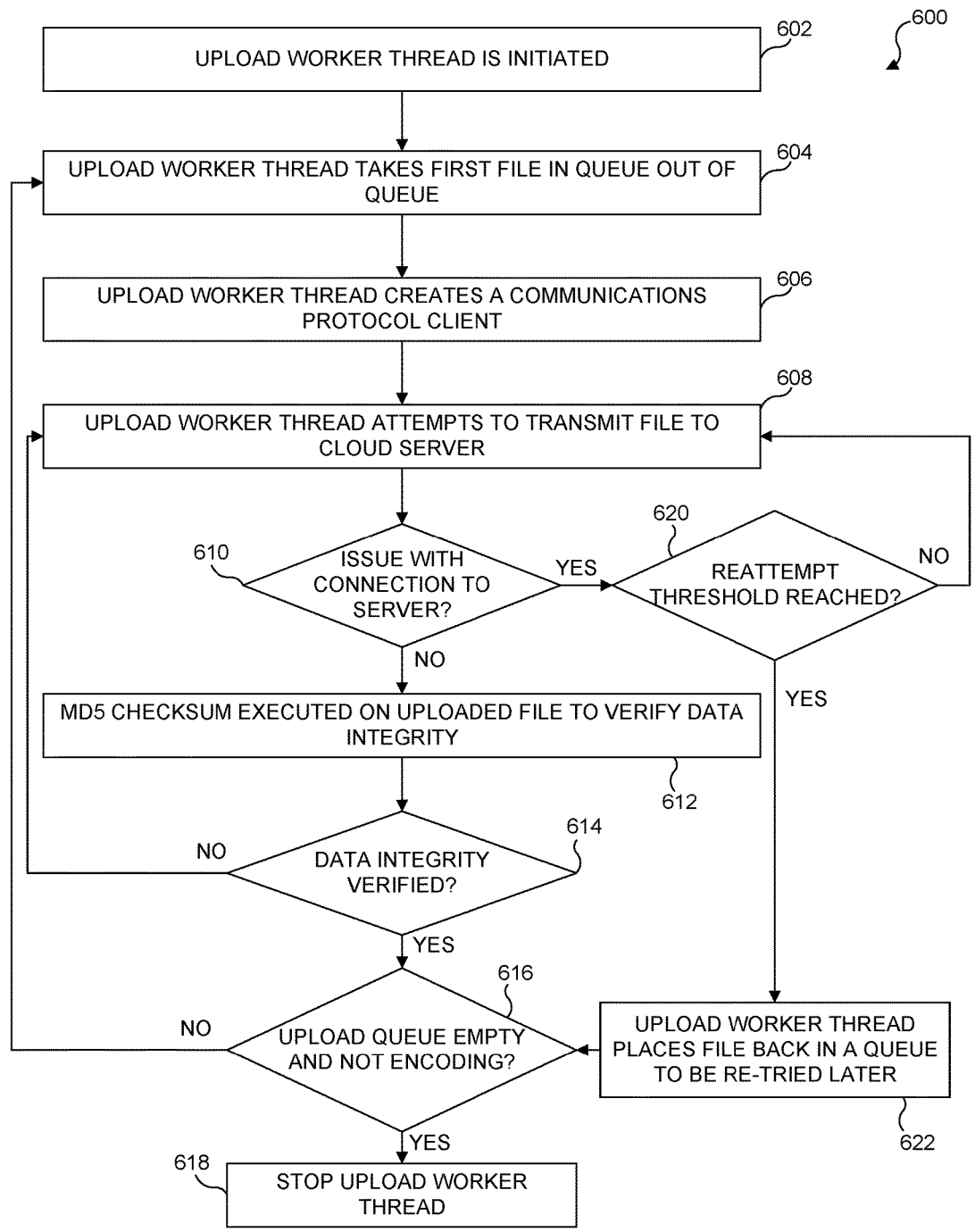
FIG. 6 illustrates a flowchart of another embodiment of an upload worker thread process.

Referring now to FIG. 6, there is illustrated a flowchart of one embodiment of an upload worker thread process 600. At step 602, an upload worker thread is initiated. At step 604, an upload worker thread takes the first file out of the upload queue. This may be done with a command such as file f=queue.take( ), or any other command that accomplishes this task. At step 606, the upload worker thread creates an instance of a communications protocol client. This may be a client using HTTP, IAP, FTP, SMTP, NNTP, or any other protocol for allowing transmission of information and files over the internet and using a transport layer protocol such as TCP. This may use a command such as HTTP Client client=new HTTP Client, for example, or another command for starting a new client. At step 608, the upload worker thread attempts to transmit the file to the cloud server 108. This attempt may use a command such as client.post(file), for example, or another command for posting the file. At decision block 610, it is determined whether there is any issue or instability with the connection to the cloud server 108. The issue may result from a drop in connection between the video encoder 106 and the cloud server 108, slow connection speeds, or any other issue that interferes with transmittal of the file to the cloud server. If at step 610 there is no issue with the connection to the cloud server, the process 600 moves to step 612.

At step 612, an MD5 checksum is executed on the uploaded file to verify data integrity of the uploaded file. At decision block 614, it is determined whether the file passed the MD5 checksum. If the uploaded file did not pass the MD5 checksum, the process moves back to step 608 to again attempt to transmit the file to the cloud server 108, replacing the failed file. If the uploaded file passes the MD5 checksum, the process moves to decision block 616. At decision block 616, it is determined whether the upload queue is now empty and whether the encoder is no longer encoding content to be added to the queue. If the upload queue is empty and the encoder is finished encoding, the process 600 ends at step 618, where the upload worker thread is terminated. If the upload queue is not empty, the process 600 moves back to step 604 to take the next file in the queue. In the event that the upload queue is empty, but the encoder is still encoding content, the upload worker thread may sleep for a small amount of time before checking the queue again to determine if a file is now available to be processed.

It will be understood that there may be more than one upload worker thread working at the same time. For example, in some embodiments, three upload worker threads may be allowed to run concurrently. One may be finishing its task while the other two are still attempting to upload files they pulled from the queue. The one finishing its task is terminated at step 618, while the other two upload worker threads continue to work.

If at decision block 610 it is determined that there is an issue with the connection to the server, the process moves to decision block 620. At decision block 620, it is determined whether a reattempt threshold has been reached. The reattempt threshold is a set number of failed upload attempts for the current upload worker thread. If the threshold has not yet been reached, the process moves back to step 608 to again attempt to transmit the file to the cloud server 108. The reattempt threshold check may also occur after decision block 614 in response to a failed MD5 checksum. If the reattempt threshold has been reached, the process 600 moves to step 622. At step 622, the upload worker thread places the file back in a queue to be re-tried at a later time. In some embodiments, the queue that the file is placed into after the reattempt threshold is reached is the same queue that the file was originally taken at step 604.

In other embodiments, there may be a separate reattempt queue created to receive only files that were attempted to be uploaded, but failed and met the reattempt threshold. This separate reattempt threshold allows for a file that failed to be uploaded to be retried sooner than if the file is placed back into the original queue because, if placed back in the original queue, all other files already in the queue would have to be processed before reupload is attempted for the failed file. If placed into a reattempt queue, however, there may be parameters implemented for triggering an upload worker thread to attempt to upload the first file in the reattempt queue instead of processing the first file in the main queue. This trigger may be based on time, on the number of upload worker threads created and terminated since the failed file was added to the reattempt queue, the number of files uploaded from the main queue since the failed file was added to the reattempt queue, or other triggers. Thus, the reattempt queue helps to shorten the amount of time in which a particular segment file is missing from the cloud server 108 in the event that an end user starts to stream the content from the cloud server 108 before all the files have been uploaded.

From step 622, the process 600 moves to decision block 616. At decision block 616, it is determined whether the upload queue is now empty and whether the encoder is no longer encoding. If so, the process 600 ends at step 618. If the upload queue is not empty, the process 600 moves back to step 602 to initiate a new upload worker thread to process the next file in the queue.

Figure 7:
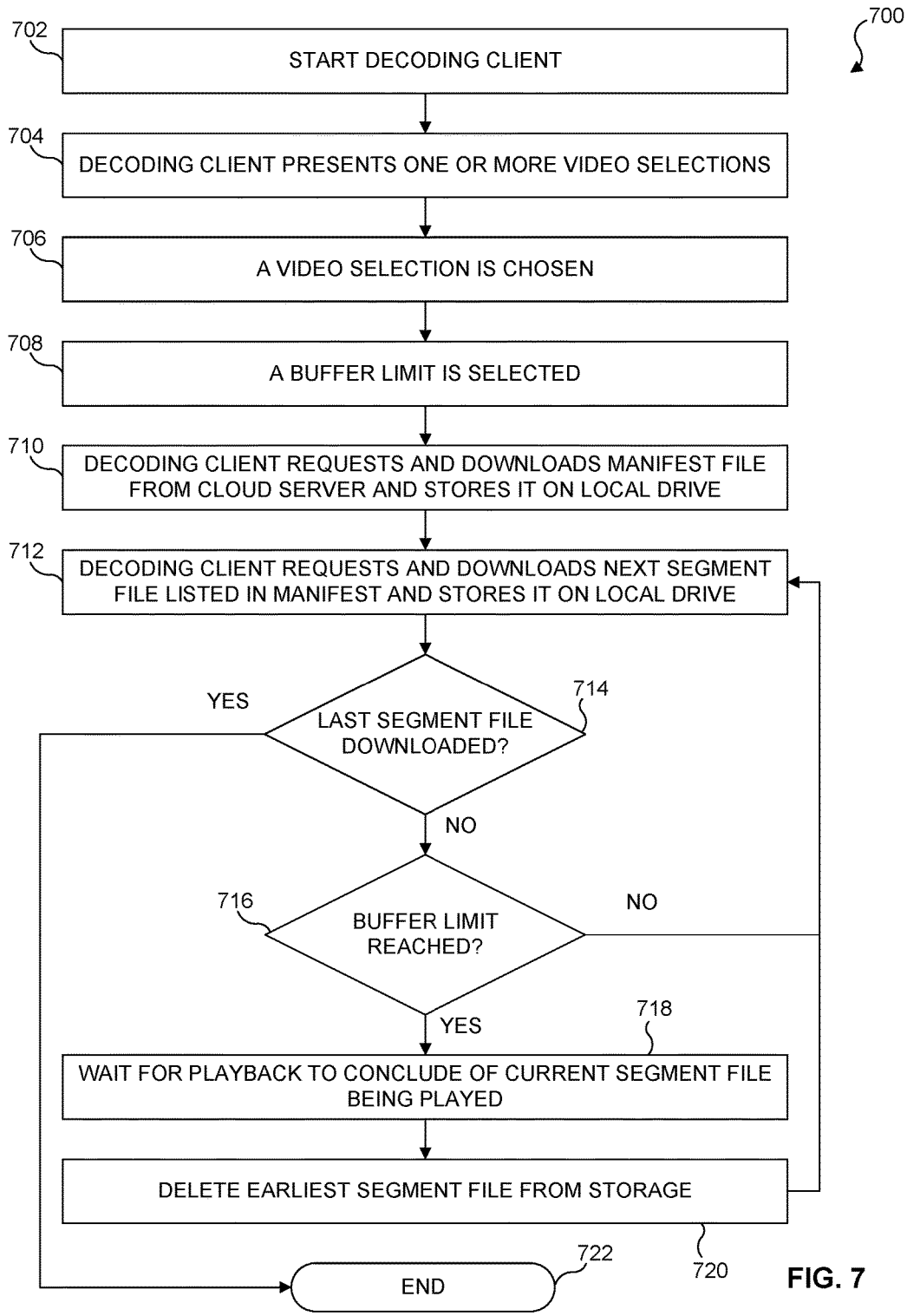
FIG. 7 illustrates one embodiment of a digital content downloading and playback method.

Referring now to FIG. 7, there is illustrated a digital content downloading and playback method 700. At step 702, a decoding client is started. The decoding client may be an application permanently stored on a device, or may instead be implemented within a website and accessed via a web browser. The decoding client may require a user to go through an authentication process in order to gain access to content. This authentication process may require a username and password, or any other means of authentication. Thus there may be a database configured at either the cloud server 108 or at the video encoder 106 to store authentication information in relation to stored digital content. In this way, only certain end users may have access to content provided by a particular capture site, and would not have access to content created by unaffiliated capture sites. The capture site 102 may be affiliated with the end users using the decoding client. Thus, a single username and password may be used for the capture site 102 and associated end users. Alternatively, each end user may all share a unique username and password, or each may have its own unique username and password, separate from that used at the capture site 102. In this way, each of the end users associated with the capture site 102 may access content uploaded by the capture site 102.

At step 704, the decoding client presents one or more video options selections available to be played. The video selections presented are either videos that have already been uploaded to the cloud server 108, or are currently in the process of being uploaded to the cloud server 108. The decoding client may additionally present this information, and may also indicate how much of a video that is currently in the process of being uploaded has been saved to the cloud server 108. At step 706, one of the video selections is chosen. At step 708, a buffer limit is selected. A buffer limit is the amount of the video to be downloaded ahead of time. So, for example, if a buffer limit of four minutes is selected, the decoding client will download four minutes of the video. If playback is started, the decoding client may continuously keep four minutes of video buffered ahead of the current point in the video being played. The buffer limit may be set to any length of time, up to the full length of the video (such as 60 minutes) on the cloud server 108.

The decoding client then saves downloaded segment files on a local drive, rather than in system memory, to allow for up to the entire video to be saved. The buffer limit allows end users to create an amount of time where, even if there is a network outage, the content will continue to be played. For example, if the buffer limit is set to 15 minutes, and that buffer limit is met (15 minutes of the content have been downloaded), the content will continue to play for 15 minutes even if there is a network outage, allowing for time for the network outage to be addressed before the content is unable to continue to be played.

At step 710, the decoding client requests and downloads a manifest file for the chosen video selection and stores it on a local drive. At step 712, the decoding client requests and downloads the next segment file listed in the manifest, starting with the first segment file, and stores it on the local drive. It will be understood that playback of the video may be started at any point after the first segment file is downloaded at step 712. Additionally, in the event that the content stored on the server is not yet complete, the downloaded manifest file may be outdated. In this event, the decoding client may download an updated manifest from the cloud server 108 to be able to find the next segment file needed. Alternatively, each segment file may include embedded lookahead information that contains the information needed to retrieve at least the next file in sequence, avoiding the need to download an updated manifest file. For example, in some embodiments, the lookahead information may contain information for the next two segment files, requiring that the next two segment files also are created before a segment file can be uploaded to the cloud server 108. At decision block 714, it is determined whether the last segment file has been downloaded. If not, the process moves to decision block 716, where it is determined if the buffer limit has been reached by the download of the segment file in step 712. If the buffer limit has not been reached, the process moves back to step 712 to begin downloading the next segment file listed in the manifest. If the buffer limit has been reached, the process moves to step 718. At step 718, the decoding client waits for playback of the current segment file being played to finish.

At step 720, the earliest segment file stored on the local drive is deleted to make room for the next segment file to be downloaded. The process then moves back to step 712 to download the next segment file listed in the manifest file. It will be understood that step 720 may not occur if it is desired that the full video remain stored. If the full video is to remain on stored, it allows for end users to back up or move forward in the content without the need to redownload segments to play previous content. It also allows for the full video to be saved and stored. This is also useful if the content is to be watched later, and if an audience is to view the content, then the content can be downloaded and stored in its entirety, avoiding any latency issues that may occur while downloading content during a time when the content is currently being played. It will also be understood that, upon download of all the segment files, the decoding client may reassemble the segments into a single file so that end users may easily move and save the video file. If at decision block 714 it is determined that the last segment file has been downloaded, the process 700 ends at step 722.

The systems and methods described herein may be used to upload and store content on the cloud server 108 ahead of time before end users need to consume content. The end users would then download content that is already fully saved on the cloud server 108. In other scenarios, end users may want to begin playback of content as soon as possible to the start of the upload process at the capture site 102. In other scenarios, a capture site 102 may begin a live event where a speaker, for example, is being recorded. To ensure that end users do not experience waiting for buffer times when trying to watch close to real time, end users may set a delay in time before which they begin consuming the content. For example, the end users may decide to not begin consuming the content until 30 minutes after recording of the event has started at the capture site 102. In this scenario, as well as other scenarios, the end user may set a buffer time, as described with respect to FIG. 7, to begin downloading the content as it is available on the cloud server.

A live event may not necessarily be constrained to only mean that end users are watching the event occurring at the capture site in real time. Rather, the live event at the capture site is recorded as a live event, i.e., no multiple takes or stopping the recording of the event, and is simultaneously, using the processes described herein, made available to be streamed to the end users. There may be a delay when end users attempt to view the event as soon as it starts at the capture site, such as 30 seconds, but the event at the capture site is still considered live. As segments are created at the video encoder 106, attempts are made to upload all the segments to the cloud server 108 while the recording of the live event is still taking place. This is to ensure that segments are made available for download as soon as possible, instead of waiting for all content to be captured before attempting to make the content available for viewing. Additionally, the system is designed to ensure that all video content is provided as high-quality content by requiring that all segment files reach the cloud server 108 as complete, high-quality, files regardless of network interruptions, rather than attempting to upload the files more quickly to meet demand by skipping segment files or degrading content. In some embodiments, a default delay time may be implemented on the decoding client 112, such as a fifteen-second delay. Depending on the speed of the network and the speed of the uploading and downloading process, this delay may be altered, such as increasing it to 30 seconds, 5 minutes, 30 minutes, an hour, etc. This delay allows for content to be downloaded during the delay time, and played once the delay time is over.

Referring now to FIG. 8A, there is illustrated a diagrammatic view of one embodiment of a combined dual stream video encoding and output system 800. The system 800 includes the capture site 102 and the video encoder 106 connected to the cloud server 108 over the network 110. The video encoder 106 is connected to more than one capture device 104. The captures devices 104 are used to capture multiple scenes at the capture site 102. For example, in FIG. 8A, there is a first scene 802 and a second scene 804. In this example shown in FIG. 8A, the first scene 802 is of a speaker on a stage and the second scene 804 is a zoomed in close up of the speaker presented on a screen at the capture site 102. Each of the capture devices 104 is focused on one of the scenes 802 and 804. The capture device 104 that is focused on the second scene 804 is zoomed and focused on the images displayed in the screen, avoiding capturing the screen border.

The video encoder 106, upon receiving the individual video streams, encodes/multiplexes the two streams into one image, or canvas. This results in a single image or video file 806 that includes both videos (of both the first and second scenes 802 and 804) in a combined image that is at a resolution that is twice the width, but the same height, as the original image. For instance, if the resolution of each of the streams captured by the capture devices 104 is 1920×1080, and is encoded/multiplexed onto the same canvas, the resulting image is at a resolution of 3840×1080. The file 806 is then uploaded to the cloud server 108 according to the methods described herein. Only a single audio file may be created during this process, unless the captured scenes include different audio. However, in the present example, only the first scene 802 is generating audio.

Referring now to FIG. 8B, there is illustrated another diagrammatic view of the system 800. A decoding client 112 downloads the previously-created file 806, containing the first and second scenes 802 and 804 combined in a 3840×1080 video. The decoding client 112 breaks out each scene in the 3840×1080 video into separate 1920×1080 outputs, effectively cutting the width of the image in the file 806 in half. The separate outputs are each displayed on separate screens, with the video captured from first scene 802 displayed on a screen 808, and the video captured from the second scene 804 displayed on a screen 810. This ensures the scenes on each of the screens 808 and 810 are completely in sync, which may not be achieved by streaming the original captured streams separately as separate videos.

Figure 9A:
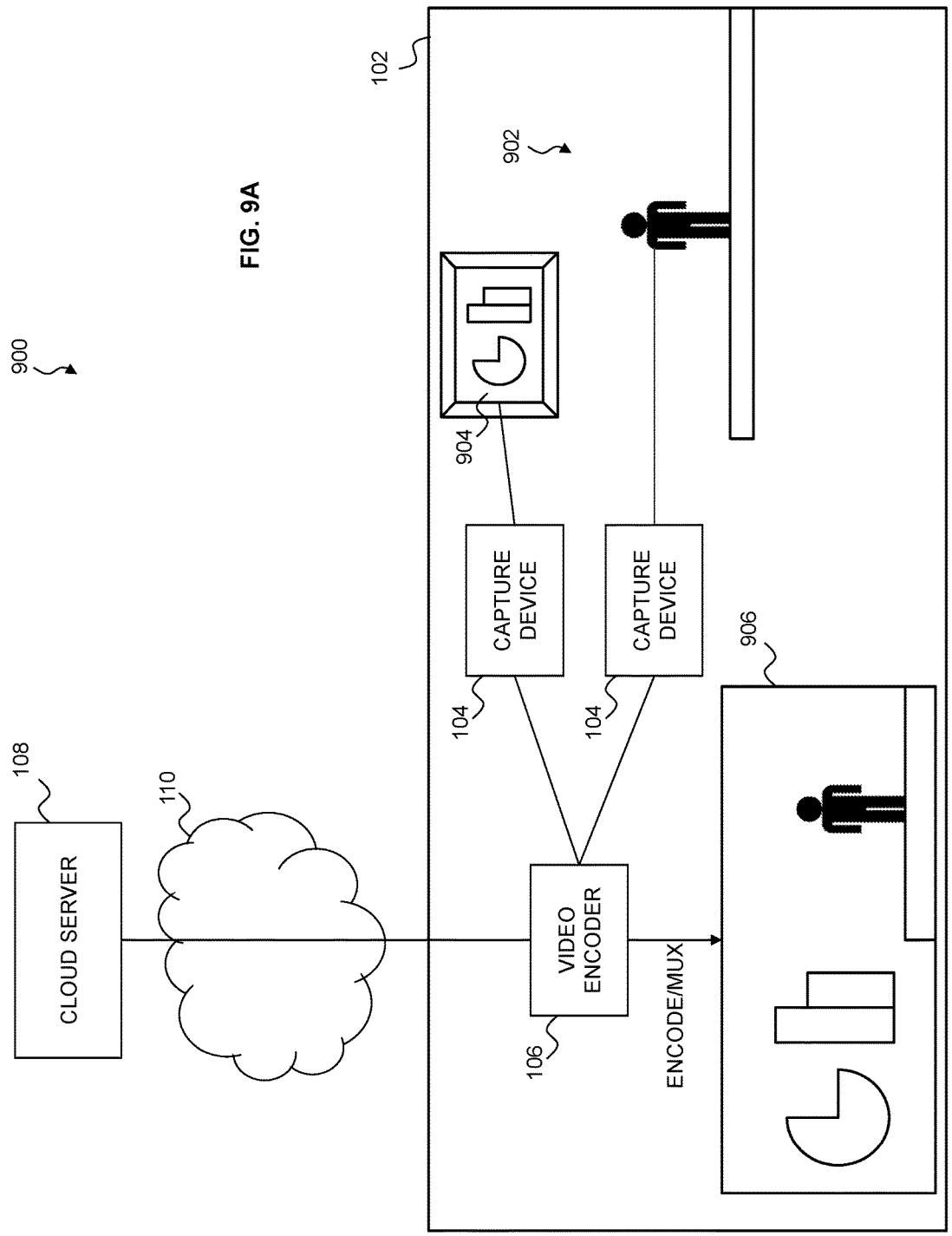
FIG. 9A illustrates a diagrammatic view of another embodiment of a combined dual stream video encoding and output system.

Referring now to FIG. 9A, there is illustrated a diagrammatic view of one embodiment of a combined dual stream video encoding and output system 900. The system 900 includes the capture site 102 and the video encoder 106 connected to the cloud server 108 over the network 110. The video encoder 106 is connected to more than one capture device 104. The captures devices 104 are used to capture multiple scenes at the capture site 102. For example, in FIG. 9A, there is a first scene 902 and a second scene 904. In this example shown in FIG. 9A, the first scene 902 is of a speaker on a stage and the second scene 904 is of a presentation, such as slides, accompanying the speaker's presentation and presented on a screen. Each of the capture devices 104 is focused on one of the scenes 902 and 904. The capture device 104 that is focused on the second scene 904 is zoomed and focused on the images displayed in the screen, avoiding capturing the screen border.

The video encoder 106, upon receiving the individual video streams, encodes/multiplexes the two streams into one image, or canvas. This results in a single image or video file 906 that includes both videos (of both the first and second scenes 902 and 904) in a combined image that is at a resolution that is twice the width, but the same height, as the original image. For instance, if the resolution of each of the streams captured by the capture devices 104 is 1920×1080, and is encoded/multiplexed onto the same canvas, the resulting image at a resolution of 3840×1080. The file 906 is then uploaded to the cloud server 108 according to the methods described herein. Only a single audio file may be created during this process, unless the captured scenes include different audio. However, in the present example, only the first scene 902 is generating audio.

Figure 9B:
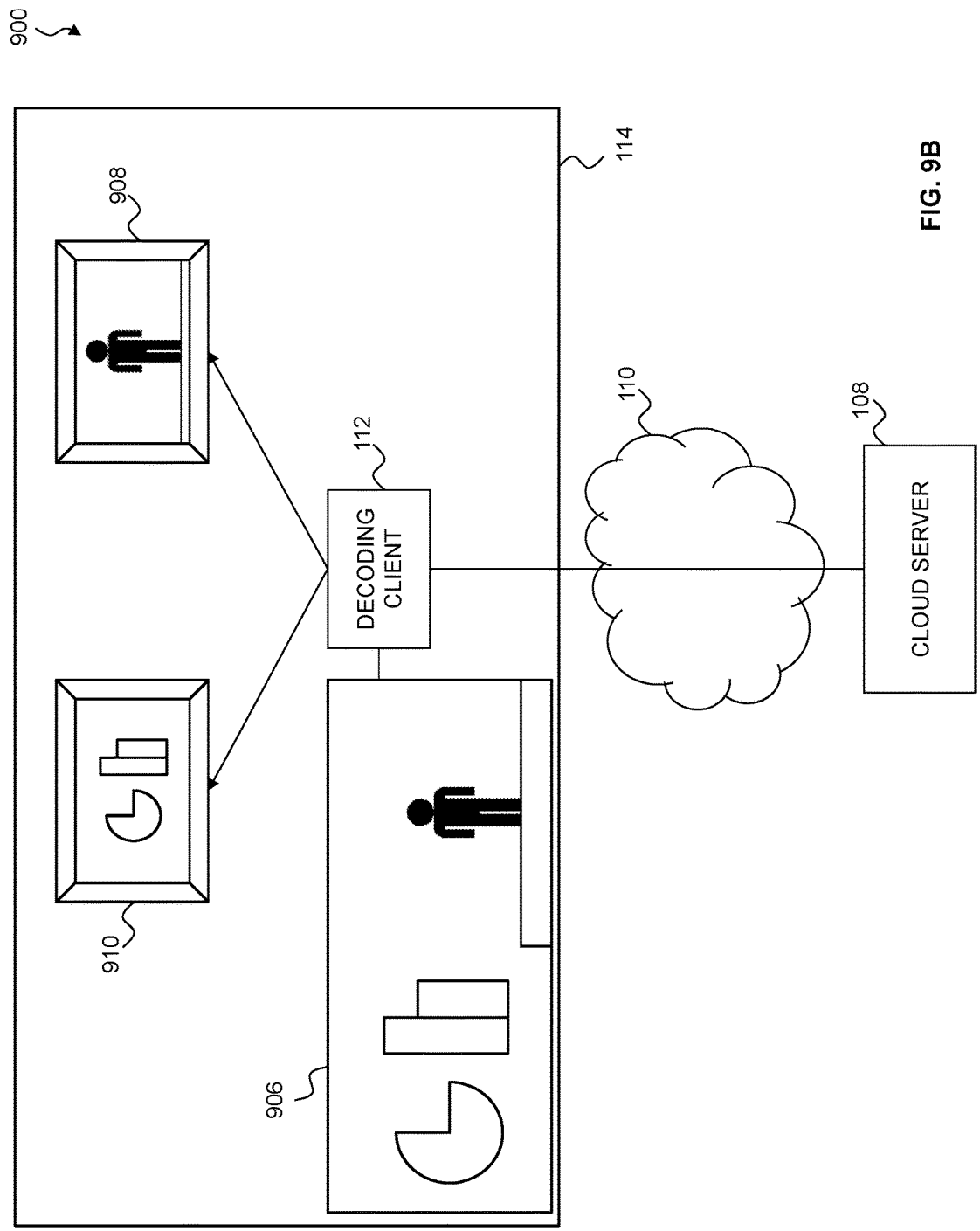
FIG. 9B illustrates another diagrammatic view of the system of FIG. 9A.

Referring now to FIG. 9B, there is illustrated another diagrammatic view of the system 900. A decoding client 112 downloads the previously-created file 906, containing the first and second scenes 902 and 904 combined in a 3840×1080 video. The decoding client 112 breaks out each scene in the 3840×1080 video into separate 1920×1080 outputs, effectively cutting the width of the image in the file 906 in half. The separate outputs are each displayed on separate screens, with the video captured from first scene 902 displayed on a screen 908, and the video captured from the second scene 904 displayed on a screen 910. This ensures the scenes on each of the screens 908 and 910 are completely in sync, which may not be achieved by streaming the original captured streams separately as separate videos.

Figure 10:
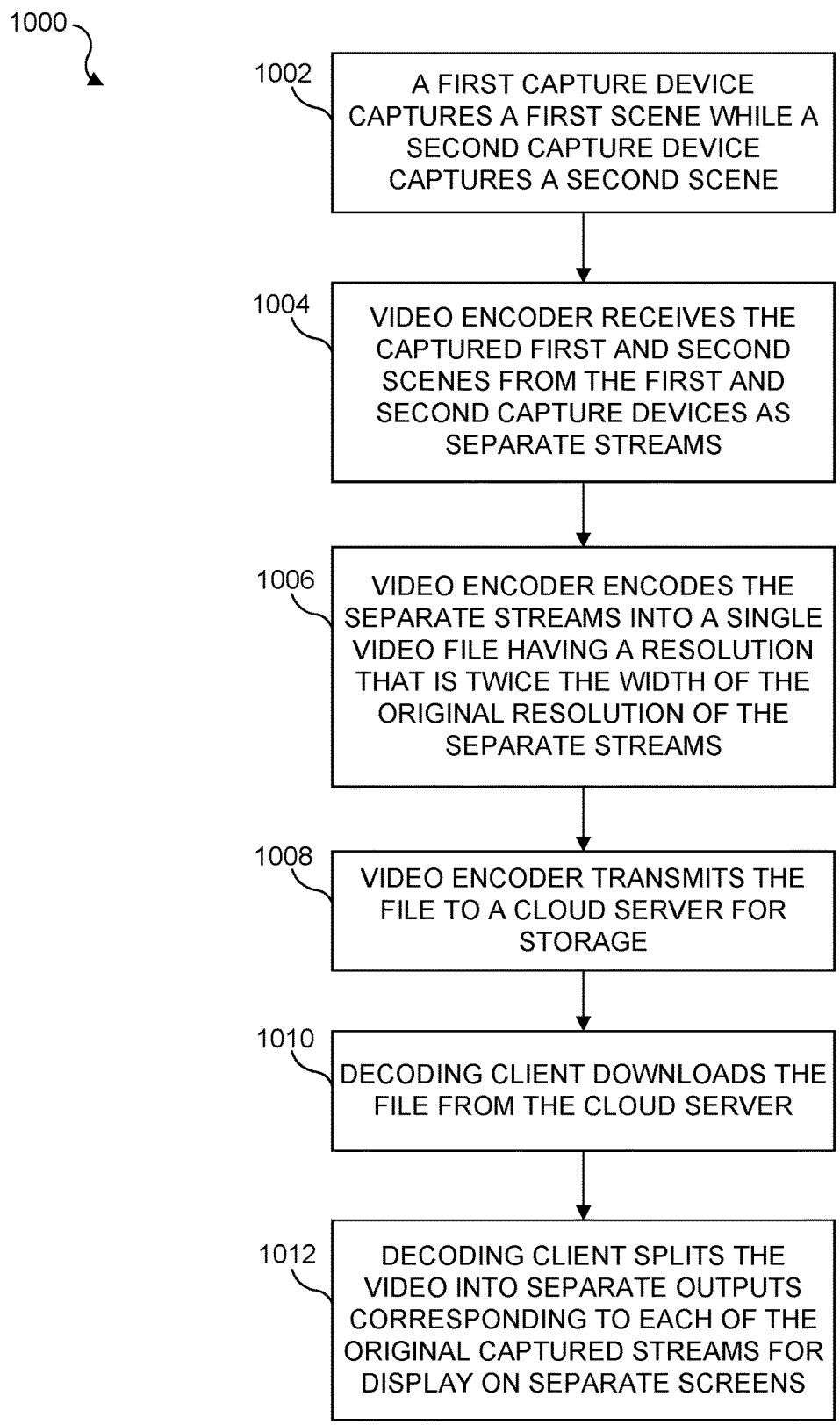
FIG. 10 illustrates a flowchart of one embodiment of a combined dual stream video encoding and output method.

Referring now to FIG. 10, there is illustrated a flowchart of one embodiment of a combined dual stream video encoding and output method 1000. At step 1002, a first capture device captures a first scene while a second capture device captures a second scene. At step 1004, a video encoder receives the captured first and second scenes from the first and second capture devices as separate streams. This may be accomplished by the video encoder having multiple video inputs associated with multiple video capture cards. At step 1006, the video encoder encodes the separate streams into a single video having a resolution that is twice the width of the original resolution of the separate streams. Thus, if the videos captured by the first and second capture devices are at a 1920×1080, the resulting resolution is 3840×1080, creating a video where each of the captured videos play side-by-side. In some embodiments, the frames may be synced by the video encoder based on the timestamp of each frame of the videos. Thus, if for some reason the timestamps differ, such as one video starting at a slightly later timestamp, the two input streams may be passed through a filter to set both videos to the same zeroed-out timestamp.

At step 1008, the video encoder transmits the newly created side-by-side video file to a cloud server for storage and eventual download. At step 1010, a decoding client downloads the file from the cloud server. At step 1012, the decoding client splits the video into separate outputs corresponding to each of the original captured streams for display on separate screens. The decoding client accomplishes this by displaying the first 1920×1080 section of the side-by-side video file on one screen, and the second 1920×1080 section on the other screen. Thus, the two images on the separate screens will correspond to the originally captured videos of the two scenes at the capture site, while being completely in sync.

Figure 11:
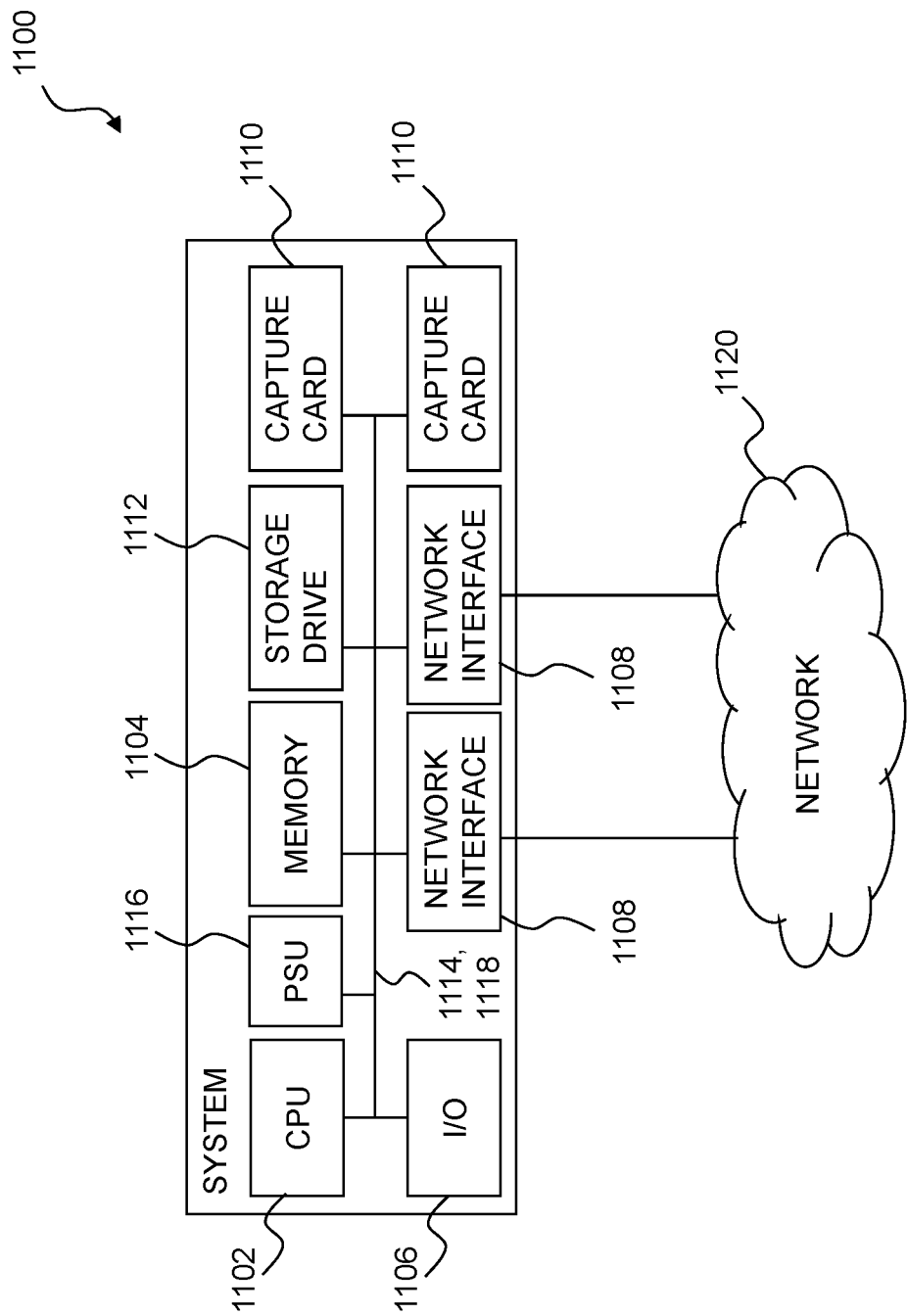
FIG. 11 illustrates a diagrammatic view of one embodiment of a device that may be used within the systems disclosed herein.

Referring to FIG. 11, one embodiment of a device 1100 is illustrated. The device 1100 is one example of a portion or all of the video encoder 106 and/or the decoding client 112 of FIG. 1, as well as potentially other clients, servers, encoders, and decoders described in FIG. 1 and in other embodiments. The system 1100 may include a controller (e.g., a processor/central processing unit ("CPU")) 1102, a memory unit 1104, an input/output ("I/O") device 1106, and at least one network interface 1108. The device 1100 may include more than one network interface 1108, or network interface controllers (NICs), to allow for a different network service provider to be switched to in the event of a network issue. For instance, if one network interface 1108 is connected to the Internet via a connection provided by AT&T, and that connection encounters an issue or fails, another network interface 1108 that is connected via a connection provided by Verizon may take over. The device 1100 may further include at least one capture card 1110 for capturing video. The device 1100 may also include a storage drive 1112 used for storing content captured by the at least one capture card 1110. The components 1102, 1104, 1106, 1108, 1110, and 1112 are interconnected by a data transport system (e.g., a bus) 1114. A power supply unit (PSU) 1116 may provide power to components of the system 1100 via a power transport system 1118 (shown with data transport system 1114, although the power and data transport systems may be separate).

It is understood that the system 1100 may be differently configured and that each of the listed components may actually represent several different components. For example, the CPU 1102 may actually represent a multi-processor or a distributed processing system; the memory unit 1104 may include different levels of cache memory, and main memory; the I/O device 1106 may include monitors, keyboards, and the like; the at least one network interface 1108 may include one or more network cards providing one or more wired and/or wireless connections to a network 1120; and the storage drive 1112 may include hard disks and remote storage locations. Therefore, a wide range of flexibility is anticipated in the configuration of the system 1100, which may range from a single physical platform configured primarily for a single user or autonomous operation to a distributed multi-user platform such as a cloud computing system.

The system 1100 may use any operating system (or multiple operating systems), including various versions of operating systems provided by Microsoft (such as WINDOWS), Apple (such as Mac OS X), UNIX, and LINUX, and may include operating systems specifically developed for handheld devices (e.g., iOS, Android, Blackberry, and/or Windows Phone), personal computers, servers, and other computing platforms depending on the use of the system 1100. The operating system, as well as other instructions (e.g., for telecommunications and/or other functions provided by the device 1100), may be stored in the memory unit 1104 and executed by the processor 1102. For example, if the system 1100 is the device 1100, the memory unit 1104 may include instructions for performing some or all of the steps, process, and methods described herein.

The network 1120 may be a single network or may represent multiple networks, including networks of different types, whether wireless or wired. For example, the device 1100 may be coupled to external devices via a network that includes a cellular link coupled to a data packet network, or may be coupled via a data packet link such as a wide local area network (WLAN) coupled to a data packet network or a Public Switched Telephone Network (PSTN). Accordingly, many different network types and configurations may be used to couple the device 1100 with external devices.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for asynchronous uploading of digital multimedia with guaranteed delivery comprising:
   at least one processor and a memory coupled to the at least one processor, the memory containing computer executable instructions that, when executed by the at least one processor, cause the system to:
   attempt by at least one upload worker thread to transmit a first container to a remote server;
   execute by the at least one upload worker thread a data integrity test on the first container upon a successful upload of the first container; and
   repeat, if the data integrity test fails, the attempt and execute steps.

2. The system of claim 1, wherein the computer executable instructions, when executed by the at least one processor, further cause the system to:

determine by the at least one upload worker thread if an instability with a connection to the remote server exists, and, if so,
   repeat the attempt and determine steps.
3. The system of claim 2, wherein the computer executable instructions, when executed by the at least one processor, further cause the system to:
   set a reattempt threshold, wherein the reattempt threshold is a number of upload reattempts allowed in the event of an instability with the connection to the remote server or a failure of the data integrity test; and
   determine upon reaching one of the repeat steps, whether the reattempt threshold has been reached, and, if so, place the first container back in an upload queue.
4. The system of claim 3, wherein placing the first container instead places the first container into a separate reattempt queue.
5. The system of claim 4, wherein the computer executable instructions, when executed by the at least one processor, further cause the system to:
   check, before the upload worker thread takes the first container from the upload queue, whether the separate reattempt queue currently contains a reattempt container, and, if so:
      remove the reattempt container from the separate reattempt queue;
      start by the at least one upload worker thread a communications protocol client, wherein the communication protocol client establishes a connection to the remote server;
      attempt by the at least one upload worker thread to transmit the reattempt container to the remote server;
      determine by the at least one upload worker thread if an instability with the connection to the remote server exists, and, if so,
         repeat the attempt and determine steps;
      execute by the at least one upload worker thread a data integrity test on the reattempt container upon a successful upload of the reattempt container;
      repeat, if the data integrity test fails, the attempt, determine, and execute steps; and
      determine upon reaching one of the repeating steps, whether the reattempt threshold has been reached, and, if so,
         place the reattempt container back in the reattempt queue.
6. The system of claim 1, wherein the computer executable instructions, when executed by the at least one processor, further cause the system to:
   create a manifest;
   store the manifest on a local storage device;
   add the manifest to an upload queue;
   create a container, wherein the container includes content therein;
   store the container on the local storage device;
   add the container to the upload queue;
   initiate at least one upload worker thread, wherein the at least one upload worker thread is a process that performs independently of the create, store, and add steps, and wherein the process performs independently of other upload worker threads;
   remove the first container from the upload queue; and
   start by the at least one upload worker thread a communications protocol client, wherein the communication protocol client establishes a connection to the remote server.

7. The system of claim 6, wherein the computer executable instructions, when executed by the at least one processor, further cause the system to encrypt the container, resulting in an encrypted container.
8. The system of claim 7, wherein the computer executable instructions, when executed by the at least one processor, further cause the system to:
   create a decryption key associated with the encrypted container;
   update the manifest to include information related to the decryption key; and
   upload by the upload worker thread the decryption key to the remote server.
9. The system of claim 6, further comprising a decoding client, wherein the decoding client includes executable instructions for:
   downloading a plurality of data from the remote server, wherein the plurality of data includes the manifest, the first container, and any other data uploaded to the remote server by the at least one upload worker thread; and
   storing the plurality of data on a local storage drive.
10. The system of claim 9, wherein the decoding client further includes instructions for:
    determining if a buffer limit has been reached, wherein the buffer limit is a set amount of data allowed to be downloaded; and
    when the buffer limit is reached, temporarily halting downloading of the plurality of data.
11. A method for asynchronous uploading of digital multimedia with guaranteed delivery, comprising:
    attempting by at least one upload worker thread to transmit a first container to a remote server;
    executing by the at least one upload worker thread a data integrity test on the first container upon a successful upload of the first container; and
    repeating, if the data integrity test fails, the attempting and executing steps.
12. The method of claim 11, further comprising:
    determining by the at least one upload worker thread if an instability with a connection to the remote server exists, and, if so,
    repeating the attempting and determining steps.
13. The method of claim 12, further comprising:
    setting a reattempt threshold, wherein the reattempt threshold is a number of upload reattempts allowed in the event of an instability with the connection to the remote server or a failure of the data integrity test; and
    determining upon reaching one of the repeating steps, whether the reattempt threshold has been reached, and, if so,
    placing the first container back in an upload queue.
14. The method of claim 13, wherein the placing step instead places the first container into a separate reattempt queue.
15. The method of claim 14, further comprising:
    checking, before the upload worker thread takes the first container from the upload queue, whether the separate reattempt queue currently contains a reattempt container, and, if so:
       removing the reattempt container from the separate reattempt queue;
       starting by the at least one upload worker thread a communications protocol client, wherein the communication protocol client establishes a connection to the remote server;

attempting by the at least one upload worker thread to transmit the reattempt container to the remote server;

determining by the at least one upload worker thread if an instability with the connection to the remote server exists, and, if so, repeating the attempting and determining steps;

executing by the at least one upload worker thread a data integrity test on the reattempt container upon a successful upload of the reattempt container;

repeating, if the data integrity test fails, the attempting, determining, and executing steps; and determining upon reaching one of the repeating steps, whether the reattempt threshold has been reached, and, if so, placing the reattempt container back in the reattempt queue.

16. The method of claim 11, further comprising:

creating a manifest;

storing the manifest on a local storage device;

adding the manifest to an upload queue;

creating a container, wherein the container includes content therein;

storing the container on the local storage device;

adding the container to the upload queue;

initiating at least one upload worker thread, wherein the at least one upload worker thread is a process that performs independently of the creating, storing, and adding steps, and wherein the process performs independently of other upload worker threads;

removing the first container from the upload queue; and starting by the at least one upload worker thread a communications protocol client, wherein the communication protocol client establishes a connection to the remote server.

17. The method of claim 16, further comprising encrypting the container, resulting in an encrypted container.

18. The method of claim 17, further comprising:

creating a decryption key associated with the encrypted container;

updating the manifest to include information related to the decryption key; and uploading by the upload worker thread the decryption key to the remote server.

19. The method of claim 16, further comprising:

downloading by a decoding client a plurality of data from the remote server, wherein the plurality of data includes the manifest, the first container, and any other data uploaded to the remote server by the at least one upload worker thread; and storing the plurality of data on a local storage drive.

20. The method of claim 19, further comprising:

determining by the decoding client if a buffer limit has been reached, wherein the buffer limit is a set amount of data allowed to be downloaded; and when the buffer limit is reached, temporarily halting downloading of the plurality of data.

* * * * *